US012749295B2

(12) United States Patent
De La Luz Segura

(10) Patent No.: US 12,749,295 B2
(45) Date of Patent: Sep. 29, 2026

(54) METHOD FOR CREATING A DEEP LEARNING-BASED MODEL AND DEVICE FOR IMPLEMENTING THE MODEL CREATED BY SAID METHOD

(71) Applicant: NEUROGENESIS IA TECHNOLOGIES SL, Barcelona (ES)

(72) Inventor: Agustín De La Luz Segura, Barcelona (ES)

(73) Assignee: NEUROGENESIS IA TECHNOLOGIES SL, Barcelona (ES)

( * ) Notice: Subject to any disclaimer, the term of this patent is extended or adjusted under 35 U.S.C. 154(b) by 236 days.

(21) Appl. No.: 18/837,475

(22) PCT Filed: Feb. 10, 2023

(86) PCT No.: PCT/IB2023/051221
§ 371 (c)(1),
(2) Date: Aug. 9, 2024

(87) PCT Pub. No.: WO2023/152705
PCT Pub. Date: Aug. 17, 2023

(65) Prior Publication Data
US 2025/0157194 A1 May 15, 2025

(30) Foreign Application Priority Data
Feb. 10, 2022 (ES) ................................ ES202230100

(51) Int. Cl.
*G06V 10/774* (2022.01)
*G06V 10/143* (2022.01)
(Continued)

(52) U.S. Cl.
CPC .......... *G06V 10/774* (2022.01); *G06V 10/143* (2022.01); *G06V 10/273* (2022.01); *G06V 10/776* (2022.01); *G06V 10/82* (2022.01)

(58) Field of Classification Search
CPC .. G06V 10/774; G06V 10/143; G06V 10/273; G06V 10/776; G06V 10/82;
(Continued)

(56) References Cited

U.S. PATENT DOCUMENTS 11,734,910 B2 * 8/2023 Mithun .................. G06V 10/82
382/224
12,005,592 B2 * 6/2024 De Gregorio ............. G06T 7/74
(Continued)

*Primary Examiner* — Michael S Osinski
(74) *Attorney, Agent, or Firm* — Cowan, Liebowitz & Latman, P.C.; Mark Montague

(57) ABSTRACT

A method comprising: providing a plurality of samples to form a dataset; providing a neural network; training the neural network with said dataset; evaluating the model, adjusting the model until an accuracy threshold is exceeded; wherein to produce the samples of the training sample set of the dataset: a stage with an object on it is provided, a background of a first color and a light source constituting a first combination is arranged, at least one image is captured, consecutively different combinations are arranged and at least one image is captured, the images are cropped to remove the part of the image that does not contain an object, each of the images is labelled with a label identifying the object category, the resulting labelled images forming part of the plurality of samples to form the dataset.

8 Claims, 7 Drawing Sheets

(51) Int. Cl.
*G06V 10/26* (2022.01)
*G06V 10/776* (2022.01)
*G06V 10/82* (2022.01)

(58) Field of Classification Search
CPC ............... G06V 10/764; G06V 10/454; G06V 10/7747; G06V 10/772; G06V 10/778; G06M 3/08; G06N 3/08; G06N 20/00; G06N 3/0464; G06N 3/09; G06N 3/045; G06N 3/04; G06N 3/084; G06T 2207/20081; G06T 2207/20084; G06T 2207/10056; G06T 7/0012; G06T 7/97; G06T 11/60; G06T 2207/20132; G06T 2207/30164
See application file for complete search history.

(56) References Cited

U.S. PATENT DOCUMENTS 12,456,287 B2 * 10/2025 Solowjow ............ G06V 10/776
2013/0182106 A1 * 7/2013 Nakamichi ............... G06T 7/11
348/143
2019/0130218 A1 * 5/2019 Albright ................ G06N 3/084
2019/0258901 A1 * 8/2019 Albright ................ G06N 3/084
2020/0089954 A1 * 3/2020 Zia .......................... G06V 20/64
2020/0265268 A1 * 8/2020 Clayton ................ G06F 18/254
2021/0327127 A1 * 10/2021 Hinterstoisser ......... G06T 19/20
2022/0051424 A1 * 2/2022 Grundy .................. G06V 10/17
2022/0114387 A1 * 4/2022 Amthor .............. G06V 10/7515
2022/0203548 A1 * 6/2022 De Gregorio ............. G06T 7/70
2022/0284616 A1 * 9/2022 Amthor ................ G06V 20/695
2022/0343635 A1 * 10/2022 Shinzaki .............. G06V 10/273
2023/0097384 A1 * 3/2023 Sao ........................... G06T 7/90
382/103
2023/0146924 A1 * 5/2023 Kumar ................... G16H 30/40
382/128
2023/0194847 A1 * 6/2023 Amthor ..................... G06T 5/77
348/80
2023/0196096 A1 * 6/2023 Milne ...................... G06N 3/09
706/25
2024/0135246 A1 * 4/2024 Miyamoto ............. G06N 3/006
2024/0296662 A1 * 9/2024 Solowjow ............... G06T 15/20
2026/0023095 A1 * 1/2026 An ......................... G01Q 30/06

* cited by examiner

METHOD FOR CREATING A DEEP LEARNING-BASED MODEL AND DEVICE FOR IMPLEMENTING THE MODEL CREATED BY SAID METHOD

FIELD OF THE INVENTION

The present invention relates to a method for the creation of a deep learning based model and a device for implementing the model created by means of such a deep learning based method.

Therefore, the present invention is primarily aimed at the Artificial Intelligence or AI industry.

BACKGROUND OF THE INVENTION

AI recently went through a plateau in its progress, commonly referred to as “AI winter”.

The end of this period was largely due to the need to create graphics cards to cater to a new field focused on entertainment and fun: video games. The struggle to dominate the video game market led various companies to specialize in the creation and distribution of video game consoles. This race in turn led to companies specializing in the creation of graphics cards to begin supplying increasingly powerful graphics cards for both game consoles and personal computers. In the latter, graphics cards were no longer integrated, but became more powerful.

This situation led to AI entering a new stage, thanks to the power of these graphics cards, which enabled the use of machine learning and more complex artificial neural networks, including deep neural networks, which perform deep learning.

Technology that focuses on deep learning, with deep neural networks, produces the black box effect, i.e. an effect that results in the sample set or dataset and the result of applying the dataset to a specimen being known, but the mechanisms used to obtain such a result from such a dataset are unknown, even if the result is 100% correct. The depth of the neural networks therefore makes the results opaque, i.e. it does not allow for interpretation of results.

On the other hand, deep learning with a black box is notable for making use of enormous computational power so that the layers containing neurons are increasingly larger in number, dimension and interaction. The massive data ingestion and the model used yields correct results, but at the cost of consuming a lot of energy because they are tied together evolutionarily to computational capacity. This is because its development has been based on hardware as the main pillar of its evolution, which is understandable given the resurgence of AI through the use of graphics cards, as mentioned above.

There is therefore a perceived lack of a system in the sector for the creation of models based on in deep learning that offers high accuracy and allows to follow the path or route that has been taken to reach the result, allowing to interpret the conclusion, while reducing the need for computational capacity.

Exposition of the Invention

The present invention therefore proposes a method for the creation of deep learning-based models that address the above-mentioned perceived gap in the sector, as well as a device for implementing the model created by such a method.

In particular, the method of the present invention is thus a method for creating a deep learning based model for solving a question in relation to a predetermined category of objects, comprising the following steps:

I) providing a plurality of samples to form a dataset, storing said dataset, and partitioning said dataset into three sample groups: training sample group, evaluation sample group, and prediction sample group, II) to determine the architecture of a neural network and provide a corresponding network neuronal, III) provide the training set of samples from the dataset to the neural network and thereby create a model, IV) let the model learn from the dataset's training set of samples, it is to train the model, detecting traits and patterns, V) save the trained model, VI) provide the evaluation sample set of the dataset to the model trained to produce a result for each sample, and to evaluate the accuracy of the results, VII) if the accuracy of the results according to the evaluation in step VI does not exceed a pre-determined threshold, adjust the trained model and repeat steps IV to VII; if the accuracy of the results according to the evaluation in step VI exceeds a threshold of default accuracy, validate the model, VIII) optionally feed the model a sample from the set of prediction samples, from among the prediction samples not fed to the model, for the model to output a result, and verify that the result is correct, IX) if there are no samples in the prediction sample set that have not been fed to the model, confirm the validity of the model, or whether there are samples in the prediction sample pool that have not been fed to the model:

if the verification of the result in step VIII indicates that the result is not correct, adjust the model and repeat steps IV to IX, if the verification of the result in step VIII indicates that the result is correct, repeat steps VIII and IX.

Once validated, the model is ready for use in AI processes.

The model can be questioned on any object category, such as fish, dog, castle, apple, text in verse, prose, sonnet, plant kingdom, legal article, human face, person jumping, engine torque development graph, etc. The object category is a predetermined parameter. The questions can be simple, requiring a yes/no outcome, for example, or complex, such as setting a staff rotation, handling calls in a customer service department, making stock investments, managing gear changes in automatic vehicle gearboxes, etc.

In accordance with the present invention, the samples of the sample group of training of the dataset are produced by the following procedure:

i) a scenario is provided, in which an object from the default object category is placed, ii) a background of a first color is arranged on the stage and a light source of a first wavelength illuminates the stage-object assembly, which is a first combination of stage background color and stage-object assembly illumination wavelength, iii) at least one image of the scene-object set is captured, iv) one or more different combinations of stage background color and illumination wavelength of the stage-object set are arranged consecutively and at least one image of the stage-object set is captured with each combination, wherein, if a plurality of images are captured with the same combination of stage background color and illumination wavelength of the stage-object set, at least two such images may be captured with the object in positions different from each other, v) the images obtained are processed by an object detection program and cropped in such a way that all the part of the image that does not contain the object is removed, vi) each of the images is tagged with a label that identifies the category of the object, the resulting labelled images being part of the plurality of samples to form the dataset, vii) optionally, the object on the stage is removed from the stage, another object from the predetermined object category is placed on the stage, and steps ii to vii are repeated.

In procedural steps iii and iv, a video can be made and frames from that video can be extracted, frames from which images will be captured.

The object placed on the stage can be the object itself or a support with a graphic representation of the object or a three-dimensional representation of the object.

The present invention makes use of the reflection of the different wavelengths that light bounces off an object, including infrared or ultraviolet, to create association maps of images, sounds, texts, etc. . . .

The use of different combinations of stage background color and illumination wavelength of the stage-object set produces different images of the same object. This technique allows very efficient training to take place. In addition, this technique makes it possible to identify in advance specific combinations that produce images that highlight specific known characteristics of the object, which allows for the identification of the object in the background and the wavelength of illumination. Time the known specific characteristics of the object that are used to arrive at the model result, i.e. to interpret the result. Therefore, the combinations can be provided randomly but, most preferably, the combinations are provided on the basis of a prior filtering, i.e. the image acquisition is carried out with a plurality of combinations and only those combinations are used to make the dataset. Captured images that produce images that highlight specific known characteristics of the object, discarding the rest if any.

Therefore, by means of the present invention, a short response time and a reliable interpretation of the model output can be achieved on the basis of the tracing of the logical path followed by the model.

The present invention, apart from its strictly technical effects, enables the regulation, legislation and application of laws to artificial intelligence models in sectors where, due to questions of interpretability, a justification is required in the decision resulting from the neural network/deep learning model.

BRIEF DESCRIPTION OF THE DRAWINGS

The features and advantages of the present invention will become clearer as follows the following detailed description of embodiments thereof, described, by way of non-limiting example, with reference to the accompanying drawings, wherein.

Parts common to more than one figure are identified by the same references in all figures.

DETAILED DESCRIPTION OF EMBODIMENTS OF THE INVENTION

Figure 1:
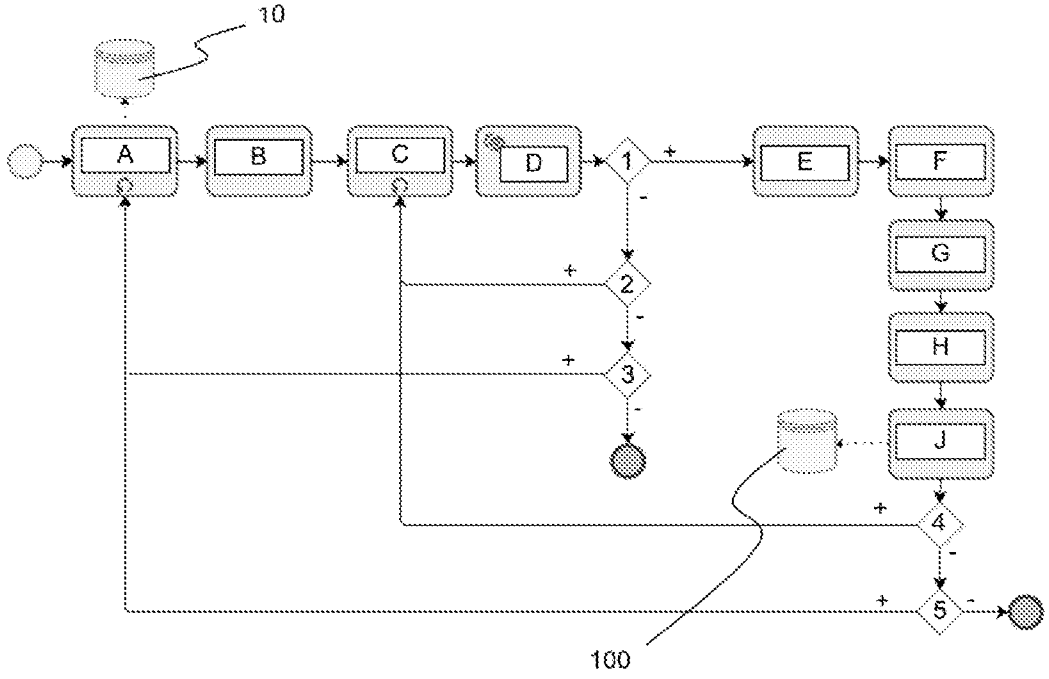
FIG. 1 is a block diagram of a dataset creation process.
Figure 2:
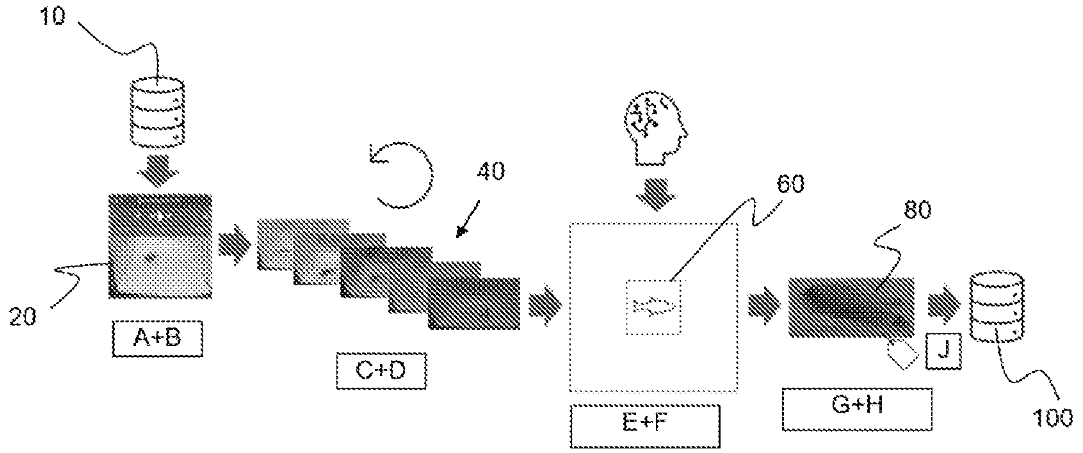
FIG. 2 is a view schematically illustrating an example of the process of FIG. 1.

FIGS. 1 and 2 refer to the process of creating a dataset.

FIG. 1 is a block diagram showing that the process of creating a dataset starts with the step of obtaining A a video, which is stored in a database 10. This video is compressed B in such a way that repeated frames are removed without losing quality.

C frames are then extracted from the compressed video. You can extract all the frames or only a number of frames.

The frames are then reviewed to detect D the elements that are in each frame.

Each element in each frame corresponds to a label, with the name of a category of objects, so it can be said that in this step D the labels for each frame. Then, each frame is subjected to a filter 1 that removes those frames in which there is no tag corresponding to the default object category for the model to be created. The default object category for the model to be created in this case is "fish."

In frames that pass filter 1 which asks the question "is there fish in the frame?" (in relation to the filters, an affirmative answer is marked as "+" and a negative answer is marked as "–"), the fish is framed E, the contours of the fish are defined F, and the frame is cropped G so that the entire surface of the frame is removed which does not include fish.

Then the image resulting from cropping the frame is labelled H only with the label "fish", and such an image is saved J as a sample of the dataset 100.

It should be noted that, by means of additional filters 2 and 4 (which ask the question "are there more frames?") and 3 and 5 (which ask the question "are there more videos?"), the process runs in a cyclical manner, until there is no video or frame left to process.

FIG. 2 is a schematic of an example of the creation of the samples of a group of training samples from a dataset, starting with a video 20 filming a fish, loaded into database 10. The video 20 is downloaded from database 10 and A+B compressed. Next, frames 40 are extracted from the video 10 and those that do not include a fish C+D are discarded, using a cyclic procedure as indicated by the circular arrow. Then, in each of the frames, the fish 60 is framed and the following is defined its E+F contour.

Finally, the frames are cropped, to remove the frame area that does not include the fish 60, and labelled as "fish" G+H, after which they are recorded J as labelled images (samples 80) in the dataset 100.

Figure 3:
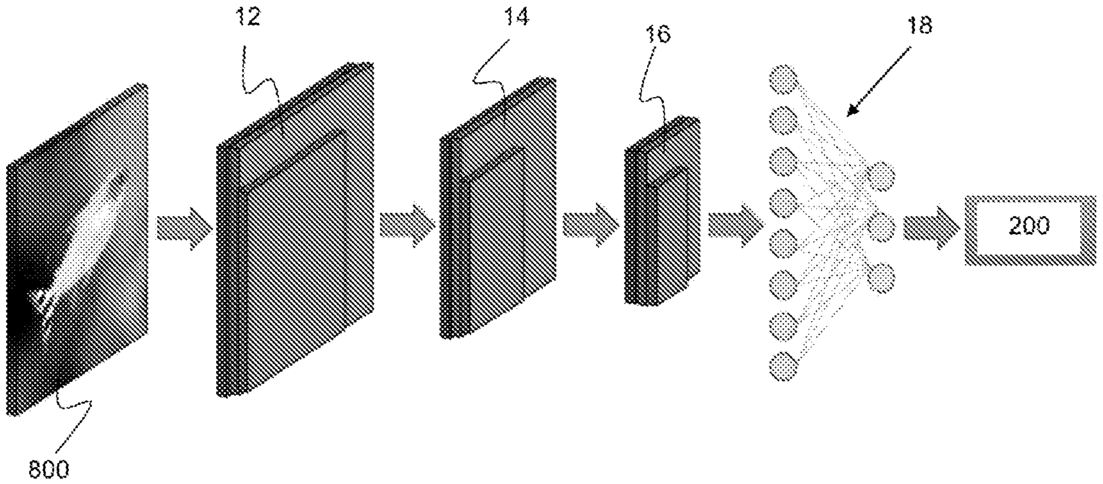
FIG. 3 is a view schematically illustrating a neural network architecture applicable to the example in FIG. 2.

FIG. 3 shows an example of a neural network architecture that can be used in combination with the dataset of the example in FIG. 2.

Specifically, such an architecture comprises three convolutional layers 12, 14, 16 consecutively, with a kernel size of 2×2, with 16, 32 and 64 conv+relu filters, respectively, for feature extraction, followed by a dense layer 18 which comprises 500 densa+relu nodes plus 30 densa+softmax nodes for classification.

It is schematically shown that a sample 800, 50×50×3 (pixels×pixels×channels), is presented to the neural network and processed consecutively through the layers convolutional 12, 14, 16 and dense layer 18, the latter yielding a prediction of 200.

Figure 4:
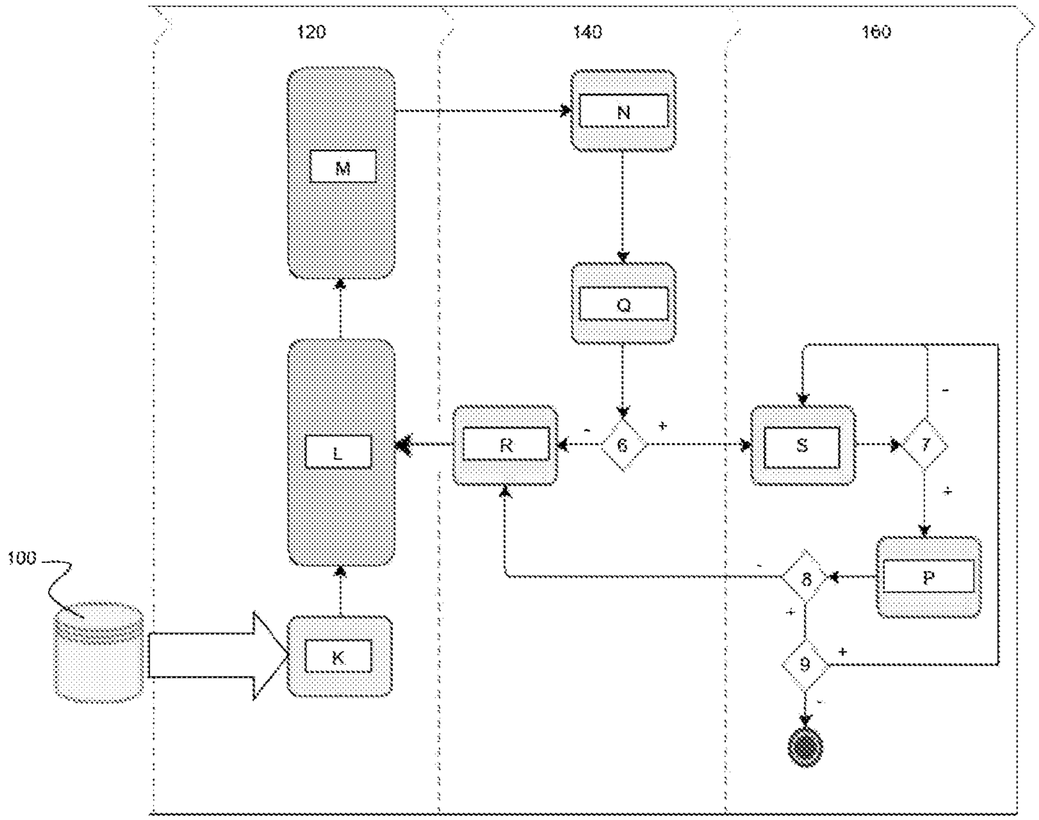
FIG. 4 is a block diagram of a model creation process.

FIG. 4 shows a block diagram of the model building process. First, the dataset 100 is partitioned K into three sample groups: training sample group, evaluation sample group, and prediction sample group. Each group of samples is allocated to the corresponding phase of the process: training phase 120, evaluation phase 140 and prediction phase 160. In this case, the dataset 100 is partitioned in such a way that 60% of the samples are allocated to training, 20% of the samples are allocated to evaluation, and 20% of the samples are allocated to prediction.

Within the training phase, L is provided with a model, and 60% of the samples, corresponding to the training set of samples, are used to train M the model.

As a start of the evaluation phase 140, N is stored in the model. Then, 20% of the samples, corresponding to the group of evaluation samples, are processed by the model and, as the result to be obtained for all of them is known, the percentage of samples that have implied a correct answer, i.e. the accuracy of the trained model, is evaluated Q. A filter 6 is then applied, which asks the question "do the results exceed a pre-determined accuracy threshold? If the answer is no, the model is adjusted R, which provides L with a new model, and thus returns the process to the corresponding step. The process thus runs cyclically until filter 6 asking the question "do the results exceed a predetermined accuracy threshold?" answers in the affirmative.

The prediction phase 160 is then initiated. First a sample from the prediction sample pool is provided S to the model and a filter 7 is then applied which asks the question "is there fish in the sample? If the answer is negative, a new sample S is simply provided to the model for the prediction phase of the process. When the answer to filter 7 is positive, then P is extracted as a prediction from the model. A filter 8 is then applied, which asks the question "correct prediction? If the answer is negative, the model is adjusted R, which provides L with a new model, and thus returns the process to the corresponding step. Conversely, if the answer is yes, a new filter 9 is applied which asks the question "are there any unprocessed samples from the prediction sample pool?, and if the answer is yes, then a new sample S is provided to the model for the prediction phase of the process. The process therefore runs cyclically until filter 9 asking the question "are there any unprocessed samples from the prediction sample pool" answers negatively. Once this phase is completed, the model is interrogated as to the percentage confidence it gives to its predictions, in order to check the confidence of the model.

Figure 5:
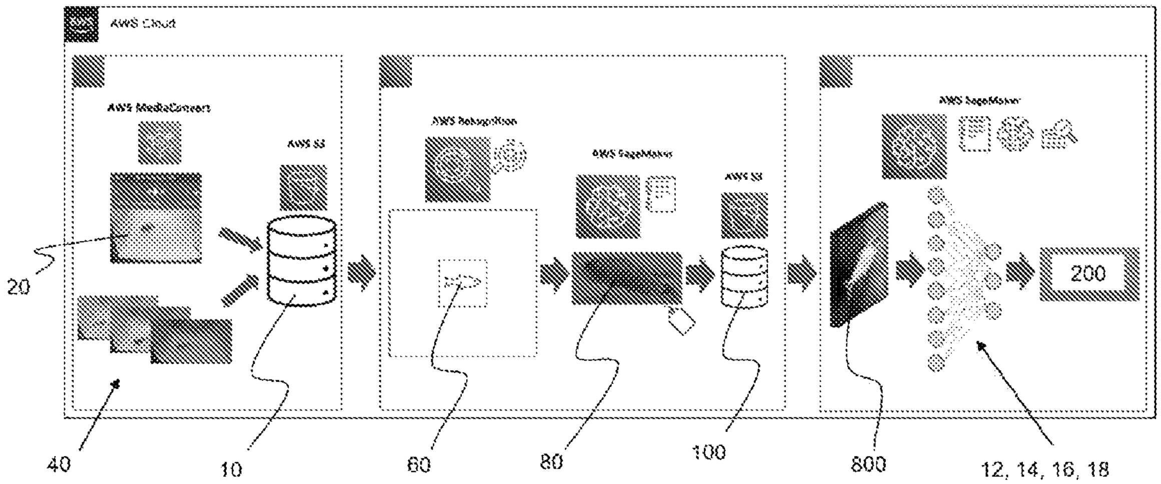
FIG. 5 is a view schematically illustrating an example of the processes of FIGS. 1 and 4, FIGS. 6*a*, 6*b* and 6*c* are schematic front, side and rear elevation views, respectively, of a fish tank applicable to the examples in the figures above.

FIG. 5 is a schematic of an example of creating a model using commercially available tools, in this case the "AWS Cloud" service, which offers several modules that perform various tasks.

In particular, it can be seen that the videos made are saved by the "AWS S3" module and compressed in the "AWS MediaConvert" module, which also splits the compressed video into frames, after which these frames are saved again by the "AWS S3" module.

Next, the "AWS Rekognition" module is used to detect and tag the elements in the frames to detect whether a fish is present in each frame, and to delete, if necessary, the frames where no fish is present. The "AWS SageMaker" module is then used to crop the frames and tag them, thus creating an image that becomes a sample of the dataset. The resulting samples are saved, again via the "AWS S3" module.

Finally, the "AWS SageMaker" module is used again to provide a neural network with a predefined architecture and to train this neural network with the samples previously saved by means of the "AWS S3" module, in order to provide a model, and the prediction phase is also carried out by means of this module.

FIGS. 6*a*-6*c* and 7 show details of the example of creating the samples of a training sample set from a dataset in FIG. 2.

Five fish, each of a different size, are available to capture the initial images, each fish from different species, which were the objects for this example.

Figure 6:
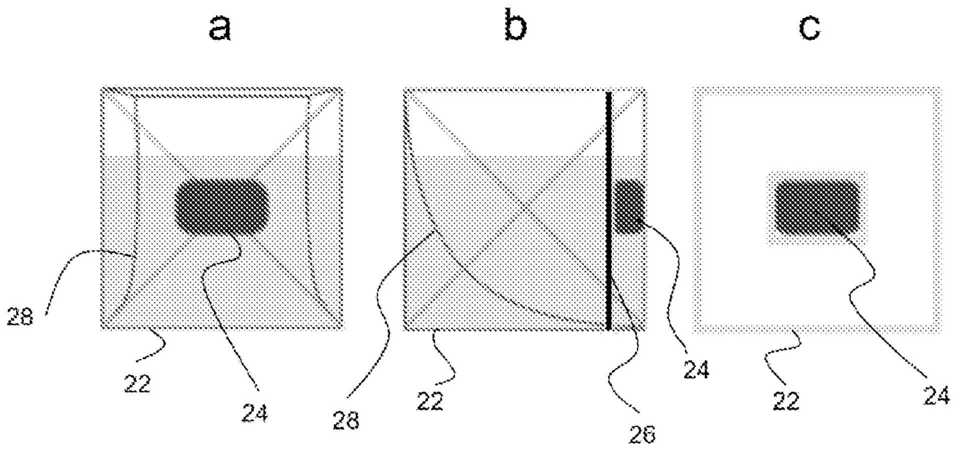
Figure 7:
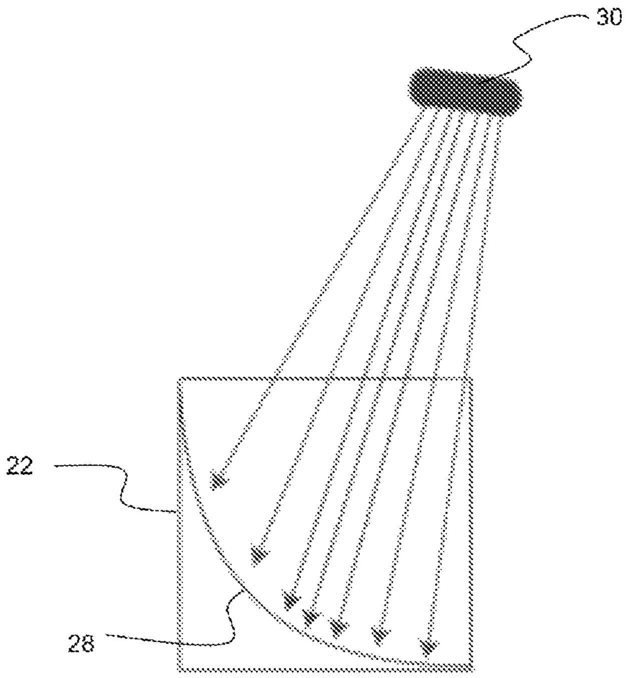
FIG. 7 is a schematic side elevation view of the fish tank of FIG. 6 with a light source.

In particular, FIGS. 6*a*, 6*b* and 6*c* show a stage, namely, a glass fish tank 22, fully cubic in size 20×20×20×20 mm, with a camera 24 fixed therein, and a 19×19 mm methacrylate partition 26 that divides the inside of the tank into two enclosures, in one of which the fish is placed and in the other of which the camera 24 is placed in a tightly fitted manner. This partition 26 prevents the fish from escaping from the camera lens and makes it possible to take high quality videos, minimizing any effect on the color and shape of the fish. The fish tank has these dimensions to be capable of to accommodate the size of all available fish. The depth of the tank should not exceed 15 cm to prevent the fish inside the tank from jumping out of the tank, e.g. because of the light stimulus to which they will be exposed.

In addition, the camera 24 is fixed to the tank 22 in such a way that it focuses from the center of the tank 22 from one side of the tank 22 slightly downwards to avoid reflections of the fish with the surface and thus to prevent the model from being confused and detecting more than one fish or a different morphology of the fish, because the water surface can act as a mirror.

Inner masks measuring 20×20×20×20 mm are created to form the bottom of the stage, i.e. the bottom of the tank. These masks have the function of lining the inside of the tank 22 in different colors.

A curved slope 28 is also provided from the lower edge of the septum 26 to the upper edge of the opposite side, which favors the placement of the fish and increases both the quality of camera focus and a level playing field in image capture.

A light source 30 is arranged substantially above the chamber 24 in such a way that the light emitted is directed at the fish tank 22 at a slight inclination, so as to facilitate the shadow on the camera lens while enhancing a higher reflection on the colors of the specimen.

Thanks to the arrangement used, the light creates a natural reflection in the center of the curve of the slope 28 and this leads to the color gradient towards white or the color of the lights implemented.

Light contributes significantly to softening or enhancing the peculiarities of a fish, either in terms of its morphological form or its characteristics as a species. By combining light and different colored backgrounds, a total of thirty videos were obtained for each of the available fish.

The combinations used for each fish, as well as the exposure time (duration of the video) with each combination, are presented below:

| | FUND | | | | | |
|---|---|---|---|---|---|---|
| LIGHT | White | Green | Light blue | Red | Black | Dark blue |
| White LED 3800 Lx | 10 s | 10 s | 10 s | 10 s | 10 s | 10 s |
| Red LED 3800 Lx | 5 s | 5 s | 5 s | 5 s | 5 s | 5 s |
| Gold LED 3800 Lx | 5 s | 5 s | 5 s | 5 s | 5 s | 5 s |
| Blue LED 3800 Lx | 5 s | 5 s | 5 s | 5 s | 5 s | 5 s |
| Pink LED 3800 Lx | 5 s | 5 s | 5 s | 5 s | 5 s | 5 s |

Different amounts of Lx are projected achieving different colors on different background colors. The purpose is to provide an environment where all fish give different characteristics with the same conditions for all. For example, a blue fish is very difficult to see on a blue background; conversely, the same blue fish is easily identifiable on a background of any other color. But if, in addition, it is bathed with a focal point of very powerful LED studio and the colors are varied, not only the background colors are changed, for example, by shining a yellow light on a blue background, a green environment of yellow light is created.

The resulting videos are processed in accordance with the above with regard to FIGS. 1 and 2.

In this way, it can be determined which peculiarities of the available fish are softened and which are enhanced in each combination of light and background, so that it can be established which peculiarities are used by the model to arrive at the result, i.e., establish the route that has been taken to reach the result, allowing the conclusion to be interpreted.

Table 1 shows the results of a comparative example of using a conventional method (called DL) versus using a method according to the invention (called OTL).

| | DL | OTL |
|---|---|---|
| Number of Images | 30000 | |
| Dataset Distribution | 70% Training<br>15% Evaluation<br>15% Prediction | |
| Computing Capacity | vCPUs: 96<br>Memory: 768 GiB<br>Price: USD 8,525 × HH | |
| Model Type | Neural Network/Deep Learning | |
| Problem Type | Multiclass Classification (6 Classes) | |
| Training Time (HH) | 0.61 | |
| Dataset Size (GB) | 32.8 | 0.6 |
| Dataset Loading Time (HH) | 1.42 | 0.4 |
| Total Cost (USD) | 17.22 | 8.61 |
| Overall Model Accuracy | 0.97 | 0.98 |
| Interpretability | 0% | 100% |
| Deductive Route Monitoring | 0% | 100% |

GB: gigabytes;
GiB: gibibyte;
HH: hours;
USD: US dollars

This comparative example shows that the application of a method of the present invention versus the application of a method of the prior art (given assumptions of number of images, dataset distribution, computing capacity, model type, problem type and training time), gives lower results in dataset size, dataset loading time and total cost, while not only maintaining but even increasing precision, in addition to providing interpretability and monitoring of the deductive path.

The invention also relates to a device for implementing the model created by means of the method of the present invention, or support containing the model created by means of the method of the present invention.

Of course, in keeping with the principle of the invention, the embodiments and details of construction may vary widely from what is described and illustrated without departing from the scope of the present invention.

The invention claimed is:

1. A method for creating a deep learning based model to solve a question for a pre-determined category of objects, comprising:

I) providing a plurality of samples to form a dataset, store such dataset and partition such dataset into three sample groups: training sample group, evaluation sample group, and prediction sample group, II) determining an architecture of a neural network and providing a corresponding neural network, III) providing the training sample group of samples from the dataset to the neural network, and thereby creating a model, IV) causing the model to learn from the training sample group of samples in the dataset by training the model through detecting features and patterns, V) saving the trained model, VI) providing the group of evaluation samples from the dataset to the trained model to output a result for each sample, and evaluate the accuracy of the results, VII) if the accuracy of the results according to the evaluation of step VI does not exceed a predetermined threshold, adjusting the trained model and repeating steps IV to VII; if the accuracy of the results according to the evaluation of step VI exceeds a predetermined accuracy threshold, validating the model;

wherein the samples of the training sample group of the dataset are produced by the following procedure:

i) a stage is provided, in which an object from the pre-determined object category is placed, ii) a background of a first color is placed on the stage and a light source of a first wavelength illuminates the stage-object set, which is a first combination of stage background color and illumination wavelength of the stage-object set, iii) at least one image of the scene-object set is captured, iv) one or more different combinations of stage background color and illumination wavelength of the stage-object set are arranged consecutively and at least one image of the stage-object set is captured with each combination, V the captured images are processed by an object detection component and cropped in such a way that the parts of the images that do not contain the object are removed, vi) each of the processed images are tagged with a label that identifies the category of the object, the resulting labelled images being part of the plurality of samples to form the dataset.

2. The method according to claim 1, further comprising:

VIII) feeding a sample from the set of prediction samples to the model, from among the prediction samples not fed to the model, for the model to output a result, and verifying that the result is correct, IX) if there are no samples in the prediction sample set that have not been fed to the model, confirming the validity of the model, or when there are samples in the prediction sample pool that have not been fed to the model:

if the verification of the result in step VIII indicates that the result is not correct, adjusting the model and repeating steps IV to IX, if the verification of the result in step VIII indicates that the result is correct, repeating steps VIII and IX.

3. The method according to claim 1, wherein, if a plurality of images are captured with the same combination of stage background color and wavelength of illumination of the stage-object, at least two such images may be captured with the object in positions different from each other.

4. The method according to claim 1, further comprising the following process steps:

vii) the object on the stage is removed from the stage, another object from the predetermined object category is placed on the stage, and steps ii to vii are repeated.

5. The method according to claim 1, wherein in process steps iii and iv, a video is made and frames from which images are to be captured are extracted from the video.

6. The method according to claim 1, wherein the object placed on the stage is the object itself or a support with a graphical representation of the object or a three-dimensional representation of the object.

7. A device for implementing a deep learning based model created in accordance with the method of claim 1.

8. A support containing a deep learning based model created according to the method of claim 1.

* * * * *